(12) United States Patent
Liu et al.

(10) Patent No.: US 12,513,622 B2
(45) Date of Patent: Dec. 30, 2025

(54) POWER CONTROL METHOD AND DEVICE

(71) Applicant: BEIJING XIAOMI MOBILE SOFTWARE CO., LTD., Beijing (CN)

(72) Inventors: Shui Liu, Beijing (CN); Deqian Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 628 days.

(21) Appl. No.: 17/875,822

(22) Filed: Jul. 28, 2022

(65) Prior Publication Data
US 2023/0319726 A1    Oct. 5, 2023

(30) Foreign Application Priority Data

Mar. 29, 2022   (CN) .......................... 202210323780.8

(51) Int. Cl.
*H04W 52/14* (2009.01)
*H04W 52/36* (2009.01)
*H04W 76/10* (2018.01)

(52) U.S. Cl.
CPC ....... *H04W 52/143* (2013.01); *H04W 52/367* (2013.01); *H04W 76/10* (2018.02)

(58) Field of Classification Search
CPC . H04W 52/143; H04W 52/367; H04W 76/10; H04W 76/12; H04W 52/12; H04W 52/243; H04W 52/265; H04W 52/346; H04W 52/146; H04W 52/247; H04W 52/281; H04W 52/18; H04W 52/288; H04W 72/0473; Y02D 30/70; H04L 5/0048; H04L 67/141
See application file for complete search history.

(56) References Cited

U.S. PATENT DOCUMENTS

| 9,907,032 B2 * | 2/2018 | Wang .................... H04W 52/34 |
| 12,279,110 B2 * | 4/2025 | Wang .................... H04W 40/02 |
| 2017/0048807 A1 | 2/2017 | Wang |
| 2017/0055227 A1 * | 2/2017 | Wu ..................... H04W 52/146 |
| 2022/0183064 A1 | 6/2022 | Talarico et al. |
| 2025/0081125 A1 * | 3/2025 | Liu ..................... H04W 52/281 |

FOREIGN PATENT DOCUMENTS

| CN | 109803365 A | 5/2019 |
| WO | WO 2019095977 A1 | 5/2019 |

OTHER PUBLICATIONS

European Patent Application No. 22187861.4, Search and Opinion Dec. 6, 2023, 17 pages.
European Patent Application No. 22187861.4, Search and Opinion dated Aug. 14, 2023, 15 pages.

* cited by examiner

*Primary Examiner* — Jae Y Lee
*Assistant Examiner* — Nhu Pham
(74) *Attorney, Agent, or Firm* — Cozen O'Connor

(57) ABSTRACT

A power control method includes: receiving a protocol data unit (PDU) session establishment request sent by a terminal device; determining a target service type carried by a PDU session corresponding to the PDU session establishment request according to a data type tag carried by the PDU session establishment request; determining a target receiving power corresponding to the target service type according to the target service type and a configured receiving power of a base station; sending the target receiving power corresponding to the target service type to the terminal device.

4 Claims, 4 Drawing Sheets

FIG. 3

POWER CONTROL METHOD AND DEVICE

CROSS-REFERENCE TO RELATED APPLICATIONS

The present disclosure claims the benefit of priority to Chinese present disclosure No. 202210323780.8, filed on Mar. 29, 2022, the contents of which are incorporated herein by reference in their entireties for all purposes.

TECHNICAL FIELD

The present disclosure relates to the technical field of communication technology, and particularly to a power control method, device, electronic device, and storage medium.

BACKGROUND

At present, a terminal device integrates games, entertainment, communication, office, service, and other functions. For example, a mobile phone may be in one of several orientations and operative modes, which include being held in a user's hand, being oriented horizontally for gaming, and being held in a selfie stick to upload video. Attenuation at the mobile phone's antenna depends on the phone's orientation, operative mode, and service scenario. Increased in antenna attenuation increases the uplink bit error rate of the mobile phone. Therefore, how to improve the power allocation of terminal device is a technical problem that needs to be solved.

SUMMARY

According to a first aspect of embodiments of the present disclosure, there is provided a power control method, performed by a station, including:
receiving a protocol data unit (PDU) session establishment request sent by a terminal device;
determining a target service type carried by a PDU session corresponding to the PDU session establishment request according to a data type tag carried by the establishment request;
determining a target receiving power corresponding to the target service type according to the target service type and a configured receiving power of the base station; and sending the target receiving power to the terminal device.

According to a second aspect of embodiments of the present disclosure, there is provided a power control method, performed by a terminal device, including:
sending at least one protocol data unit session establishment request to a base station;
obtaining the target receiving power corresponding to each target service type sent by the base station; wherein each target receiving power is configured by the base station according to each target service type carried by each protocol data unit session, and the target service type is determined by the base station according to a data type tag carried by each establishment request;
determining a target transmission power of a terminal device corresponding to each target service type, according to each target receiving power and a maximum transmission power of the terminal device.

According to a third aspect of embodiments of the present disclosure, there is provided a base station, including:

a processor; and
a memory communicatively connected to the processor and storing non-transitory computer-readable instructions that, when executed by the processor, control the processor to implement the method described in the first aspect.

According to a fourth aspect of embodiments of the present disclosure, there is provided a terminal device, including:
a processor; and
a memory communicatively connected to the processor and storing non-transitory computer-readable instructions that, when executed by the processor, control the processor to implement the method described in the second aspect.

Additional aspects and advantages of the present disclosure will be given in the following description, some of which will become apparent from the following description, or known through the practice of the present disclosure.

BRIEF DESCRIPTION OF THE DRAWINGS

The above and/or additional aspects and advantages of the present disclosure will be apparent and easy to understand from the following description of the embodiments together with the drawings, wherein.

DETAILED DESCRIPTION

Figure 1:
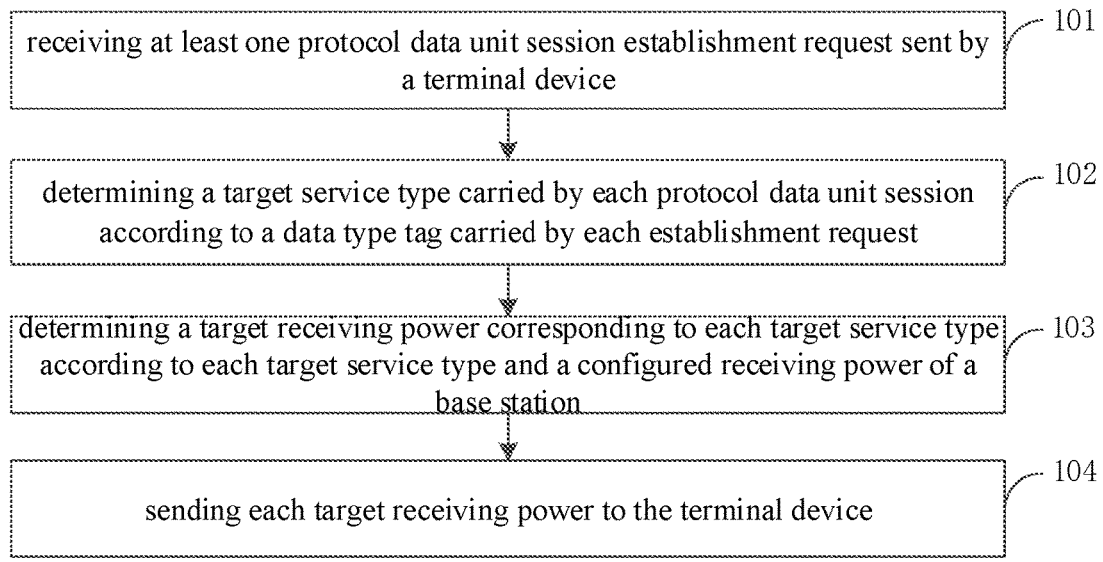
FIG. 1 is a flow chart of a power control method according to an embodiment of the present disclosure.

The following describes in detail the embodiments of the present disclosure, examples of which are shown in the drawings, wherein the same or similar reference numerals represent the same or similar elements or elements having the same or similar functions. The embodiments described below with reference to the drawings are exemplary and are intended to explain the present disclosure, but are not to be understood as limiting the present disclosure.

The power control method, device, electronic device, and storage medium of embodiments of the present disclosure are described below with reference to the accompanying drawings.

FIG. 1 is a flow chart of a power control method according to an embodiment of the present disclosure.

The execution subject of the power control method of the embodiment of the present disclosure is the power control device, which is set in the base station, wherein the base station is arranged in the wireless access network to provide wireless access function for terminal device. The base station can communicate wirelessly with the terminal device through one or more antennas, and provide communication coverage for its geographical area. The base station can include macro base station, micro base station, relay station, access point and others. In some embodiments, a base station may be referred by those skilled in the art as a base station transceiver, a wireless base station, an access point, a wireless transceiver, a basic service set (BSS), an extended service set (ESS), a node B (NodeB), an evolved node B (eNB or eNodeB), or other appropriate terms. For example, in a 5G system, a base station is referred as gNB. For convenience of description, in the embodiments of the present disclosure, the above devices that provide wireless communication function for terminal device are collectively referred as base stations or network devices.

As shown in FIG. 1, this method includes the following steps: step 101, receiving at least one protocol data unit session establishment request sent by a terminal device; step 102, determining a target service type carried by each protocol data unit session according to a data type tag carried by each establishment request; step 103, determining a target receiving power corresponding to each target service type according to each target service type and a configured receiving power of a base station; and step 104, sending each target receiving power to the terminal device.

Step 101, at least one protocol data unit session establishment request sent by a terminal device is received.

The terminal devices can be dispersed in the whole mobile communication system and communicate with the base station, and each terminal device can be static or mobile, and can be any computing device capable of data processing, such as notebook, smartphones, wearable devices and other mobile computing devices, or desktop computers and other static computing devices or servers, or other types of computing devices. The present disclosure is not limited thereto.

In practice application, different customers have different service needs. By using network slicing technology, mobile operators can divide customers into different types of tenants, and each tenant has different service needs. For example, customers of instant services, such as Wechat, do not want to have a large delay when sending instant messages; while the customers of mail service have lower requirements for delay. The service requirements corresponding to different customers determine different slice types according to service level agreement. In 5G services, when there is a new service request, different services are segmented to the corresponding protocol data unit session through network slices according to the relevant resources corresponding to the service type, that is, different types of services are configured to different PDU bearers.

In one implementation of the embodiment of the present disclosure, the base station receives at least one protocol data unit (PDU) session establishment request sent by the terminal device when it will execute the corresponding service, wherein PDU is the basic unit of sending data specified in the protocol, and each PDU session carries the data type tag of the session to be established, and the data type tag indicates the service type.

Step 102, a target service type carried by each protocol data unit session is determined according to a data type tag carried by each establishment request.

The target service types include voice service type, instant messaging service type, small video service type, reading service type and services with weak timeliness. The services with weak timeliness are, for example, e-mails, posts, etc.

In the embodiment of the present disclosure, the base station determines the target service type carried by each PDU session according to the data type tag carried by the establishment request of each PDU session, so that the base station can determine each target service to be executed by the terminal device and the service type of each target service. The tag of data type can be a set field, different fields indicate different service types. For example, the data type tag carried by the PDU session establishment request indicates that the target service type is voice service, such as calling or video; or, the data type tag carried by the PDU session establishment request indicates that the target service type is small video service.

Step 103, a target receiving power corresponding to each target service type is determined according to each target service type and a configured receiving power of the base station.

Different target service types have different service requirements. For example, different target service types have different requirements for delay, so there are differences in the timeliness of processing. Meeting different service requirements can be achieved by configuring different power for different target service types. Therefore, in the embodiment of the present disclosure, different target receiving power is configured for different target service type. As an implementation, according to each target service type, the configured receiving power of the base station is distributed to each target service type according to the different service requirements of each target service type, that is, the different power requirements, so that different service types have corresponding target receiving power. The target receiving power is configured by the base station to the terminal device based on different service types, such that when the terminal device executes different service types, the corresponding different target transmission power can be determined through the configured different target receiving power and the power control protocol, so as to meet the needs of different conditions.

Step 104, each target receiving power is sent to the terminal device.

In the embodiment of the present disclosure, the base station sends the target receiving power corresponding to the target service type and related to the base station to the terminal device, so that when the terminal device executes the corresponding target service type, it can calculate the transmission power of the corresponding terminal device according to the power control algorithm specified in the 3GPP protocol, and meet the personalized configuration with different service characteristics.

In the power control method of the embodiment of the present disclosure, the establishment request of at least one PDU session sent by the terminal device is received, the target service type carried by each PDU session is determined according to the data type tag carried by each establishment request, and the target receiving power corresponding to each target service type is determined according to each target service type and a configured receiving power of the base station, the target receiving power corresponding to each target service type is sent to the terminal device. This meets the personalized configuration with different service characteristics, by configuring the desired target receiving power of the base station for different service types.

Figure 2:
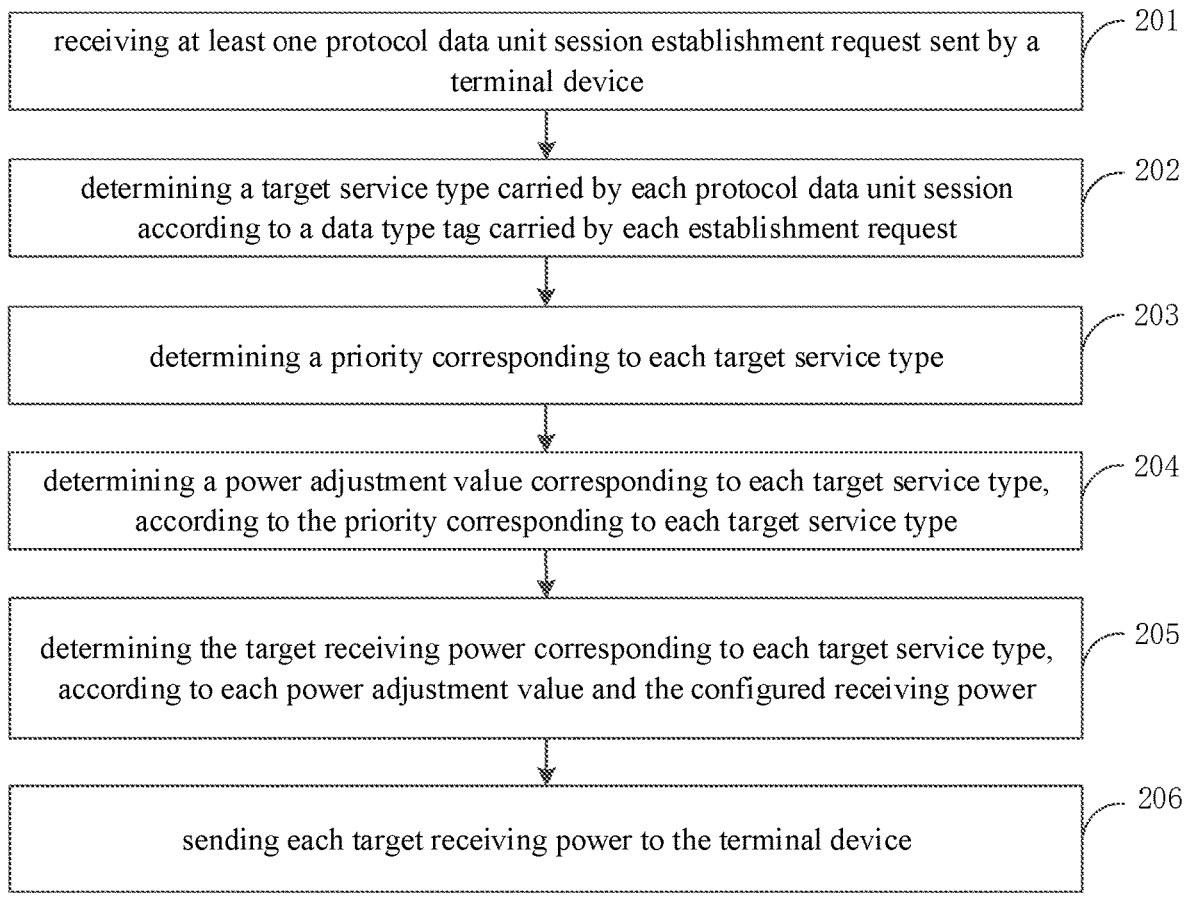
FIG. 2 is a flow chart of another power control method according to an embodiment of the present disclosure.

Based on the previous embodiment, the embodiment of the present disclosure provides another power control method. FIG. 2 is a flow chart of another power control method according to an embodiment of the present disclosure.

As shown in FIG. 2, the method can include the following steps: step 201, receiving at least one protocol data unit session establishment request sent by a terminal device; step 202, determining a target service type carried by each protocol data unit session according to a data type tag carried by each establishment request; step 203, determining a priority corresponding to each target service type; step 204, determining a power adjustment value corresponding to each target service type according to the priority corresponding to each target service type; step 205, determining the target receiving power corresponding to each target service type, according to each power adjustment value and the configured receiving power; step 206, sending each target receiving power to the terminal device.

Step 201, at least one protocol data unit session establishment request sent by a terminal device is received.

Step 202, a target service type carried by each protocol data unit session is determined according to a data type tag carried by each establishment request.

Steps 201 to 202 can be explained with reference to the foregoing embodiments, the principles are the same, and are not limited in this embodiment.

Step 203, a priority corresponding to each target service type is determined.

In the embodiment of the present disclosure, different priorities are set for different target business types, the priority can be set based on the requirements of different service conditions. For example, different priorities are determined based on the processing delay. When the priority is high, more resources and bandwidth are required to improve the timeliness of processing.

As an example, for a mobile network, the priority corresponding to each target service type is determined according to the timeliness requirement of the target service type. Table 1 indicates each target service type and corresponding priority.

TABLE 1

| target service type | priority (the smaller the number, the higher the level) | power adjustment value |
|---|---|---|
| voice service | 1 | P1 |
| instant messaging service, such as Wechat, | 2 | P2 |
| small video service, such as Tik Tok, | 3 | P3 |
| video service and reading service | 4 | P4 |
| services with weak timeliness, such as e-mails | 5 | P5 |

Only some service types are listed in Table 1, those skilled in the art can divide the service types and determine the corresponding priority of each service type according to the service requirements, which is not limited in this embodiment.

Step 204, the power adjustment value corresponding to each target service type is determined according to the priority corresponding to each target service type.

In the embodiment of the present disclosure, when the priority corresponding to the service type is high, it indicates that this service type has high requirements for bandwidth resources, small tolerance for delay, and needs to configure greater power, that is, the higher the priority corresponding to the service type, the greater the demand for the corresponding power adjustment value. According to the mapping relationship between different service types and power adjustment values, the power adjustment values corresponding to different service types can be determined by lookup, wherein the power adjustment value is used to allocate the configured receiving power corresponding to the base station, the configured receiving power is used for the terminal device to determine the corresponding transmission power of the terminal device according to the existing power control protocol, so as to determine different power control schemes for different service types to meet the data transmission requirements of different services.

Specifically, as shown in Table 1, P1 is the power adjustment value corresponding to the voice service, such as the dial-up call service. As an implementation, the power adjustment value is an offset of the desired target receiving power configured by the base station for the terminal device. The effective range of power adjustment value is [−2 dB, −1.5 dB, −1.0 dB, −0.5 dB, 0 dB, 0.5 dB, 1 dB, 1.5 dB, 2 dB]. For example, the base station receives the service request of two services that the terminal device needs to execute synchronously, one is voice service and the other is mail service. The corresponding priority of voice service is 1, and the corresponding power adjustment value is 2 dB, while the timeliness requirement of mail is low, the corresponding priority is 5, and the corresponding power adjustment value is −2 dB, which realizes the determination of different power adjustment values based on different service priorities.

Alternatively, the power adjustment value can also be a coefficient. For example, the priority of voice service is 1, and the corresponding power adjustment value is X1, while the timeliness requirement of email is low, and the corresponding priority is 5. The power adjustment value of email service is X2, where X1 is greater than 1 and X2 is less than 1.

Step 205, the target receiving power corresponding to each target service type is determined according to each power adjustment value and the configured receiving power.

In the embodiment of the present disclosure, different service types have different requirements for resources, so the corresponding power adjustment values are different. Through the power adjustment values, the configured receiving power determined by the base station is allocated among different services, so that when the sum of the configured receiving power remains unchanged, the service with high priority needs to be allocated with more target receiving power, and the service with low priority needs to be allocated with less target receiving power, which realizes the dynamic allocation of the target receiving power within the range of configured receiving power, the target receiving power is used to calculate the target transmitting power by the terminal device. That is, the target receiving power is configured by the base station to the terminal device to determine the target transmission power, in which, the method of determining the target transmission power by the terminal device will be described in detail in following embodiments.

As an implementation, the power adjustment value is the offset value. For example, the terminal device needs to synchronously execute two services, one is voice service, and the other is mail service, the corresponding priority of voice service is 1, and the corresponding power adjustment value is 2 dB, while the timeliness requirement of mail is low, the corresponding priority is 5, the corresponding power adjustment value is −2 dB, and the configured power is 10 dB, then it is determined that the target receiving power corresponding to the voice service type is 7 dB, and the target receiving power corresponding to the mail service type is 3 dB, which realizes the dynamic allocation of the target receiving power corresponding to different services within the range of the configured receiving power.

Alternatively, the power adjustment value can also be a coefficient. For example, the power adjustment value corresponding to the voice service is X1, and the power adjustment value corresponding to the mail service is X2, the target transmission power P1 is obtained after the adjustment of the voice service according to the corresponding power adjustment value, and the target transmission power P2 is obtained after the adjustment of the mail service according to the corresponding power adjustment value, while the sum of P1 and P2 is still equal to the configured receiving power, which realizes the dynamic allocation of target receiving power corresponding to different services within the range of configured receiving power.

Step 206, each target receiving power is sent to the terminal device.

Step 206 can be explained with reference to the foregoing embodiments, the principles are the same, and are not limited in this embodiment.

In the power control method of the embodiment of the present disclosure, the establishment request of at least one PDU session sent by the terminal device is received, the target service type carried by each PDU session is determined according to the data type tag carried by each establishment request, and the target receiving power corresponding to each target service type is determined according to each target service type and a configured receiving power of the base station, the target receiving power corresponding to each target service type is sent to the terminal device. This meets the personalized configuration with different service characteristics, by configuring the desired target receiving power of the base station for different service types.

Figure 3:
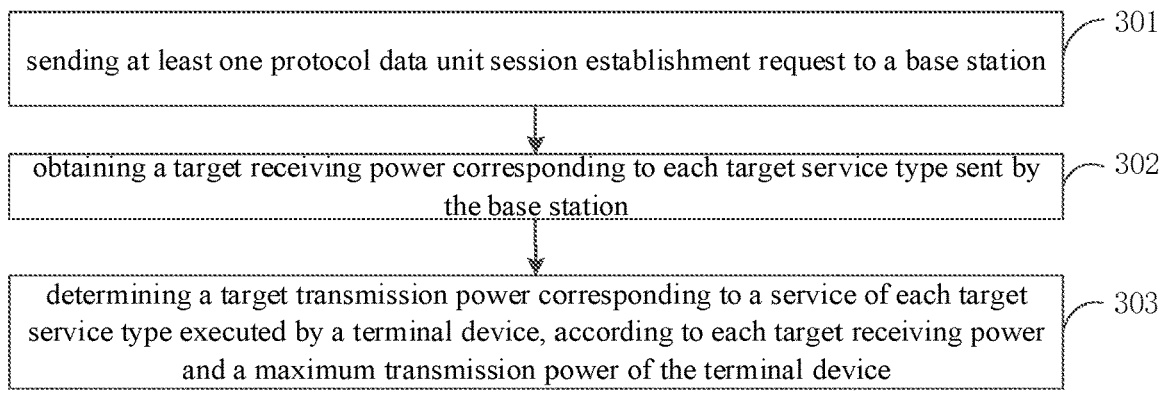
FIG. 3 is a flow chart of another power control method according to an embodiment of the present disclosure.

In order to implement the above embodiments, the embodiment of the present disclosure provides another power control method. FIG. 3 is the flow chart of another power control method provided by the embodiment of the present disclosure, as shown in FIG. 3, the method includes the following steps: step 301, sending at least one protocol data unit session establishment request to a base station; step 302, obtaining the target receiving power corresponding to each target service type sent by the base station; step 303, determining a target transmission power corresponding to services of each target service type executed by a terminal device, according to each target receiving power and a maximum transmission power of the terminal device.

Step 301, at least one protocol data unit session establishment request is sent to the base station.

The protocol data unit session can be explained with reference to the step 101, the principles are the same, which will not be repeated in this embodiment.

Step 302, the target receiving power corresponding to each target service type sent by the base station is obtained.

The target receiving power is configured by the base station according to the target service type carried by the protocol data unit session, and the target service type is determined by the base station according to a data type tag carried by the session establishment request The step 302 can be explained with reference to previous embodiments, the principles are the same, which will not be repeated in this embodiment.

Step 303, the target transmission power corresponding to services of each target service type executed by the terminal device is determined according to each target receiving power and a maximum transmission power of the terminal device.

The maximum transmission power of the terminal device is the maximum uplink transmission power determined between the base station and the terminal device.

In an implementation of the embodiment of the present disclosure, according to the power control protocol in the 3GPP standard and the target receiving power corresponding to each service type and configured by the base station, the target transmission power corresponding to the service of each service type executed by the terminal device can be determined. At the same time, when executing multiple services, the sum of the target transmission power corresponding to the services of each service type executed by the terminal device is less than or equal to the maximum transmission power. When the sum of the determined multiple target transmission power is greater than the maximum transmission power, it is necessary to modulate each target transmission power according to the proportion between the maximum transmission power and the multiple targets transmission power, so that the sum of the multiple target transmission power is less than or equal to the maximum transmission power.

In the power control method of the embodiment of the present disclosure, at least one protocol data unit session establishment request is sent to the base station, the target receiving power corresponding to each target service type sent by the base station is obtained, the target transmission power corresponding to services of each target service type executed by the terminal device is determined according to each target receiving power and a maximum transmission power of the terminal device. The terminal device obtains the desired target receiving power of different base stations configured for different service types, and determines the target transmitting power corresponding to different service types according to the maximum transmitting power and power control protocol, which meets the personalized configuration with different service characteristic.

Figure 4:
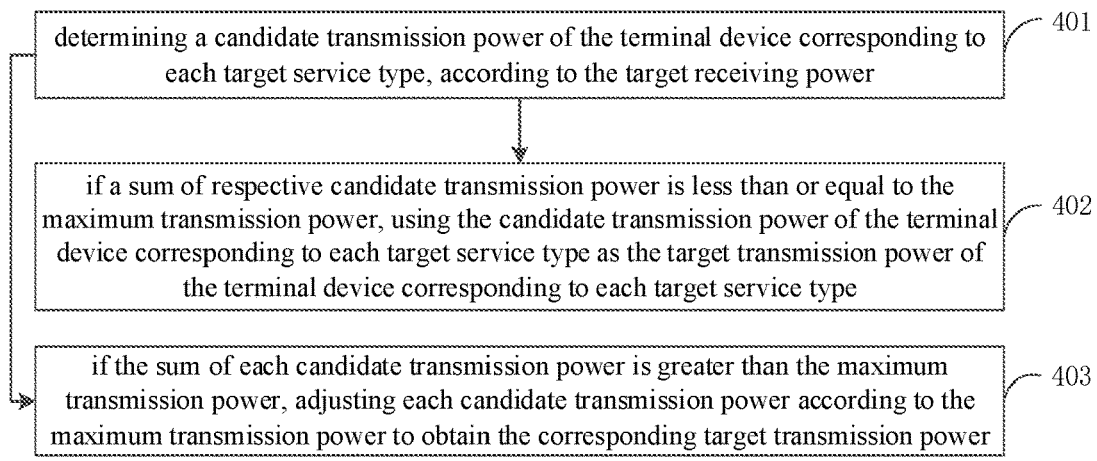
FIG. 4 is a flow chart of another power control method according to an embodiment of the present disclosure.

Based on the above embodiments, FIG. 4 is a flow chart of another power control method provided by the embodiments of the present disclosure. As shown in FIG. 4, step 303 includes the following steps: step 401, determining a candidate transmission power of the terminal device corresponding to each target service type according to the target receiving power; step 402, when the sum of each candidate transmission power is less than or equal to the maximum transmission power, using the candidate transmission power of the terminal device corresponding to each target service type as the target transmission power of the terminal device corresponding to each target service type; step 403, when the sum of each candidate transmission power is greater than the maximum transmission power, adjusting each candidate transmission power according to the maximum transmission power to obtain the corresponding target transmission power.

Step 401, a candidate transmission power of the terminal device corresponding to each target service type can be determined according to the target receiving power.

In an implementation of the embodiment of the present disclosure, a reference signal is obtained from the base station, which can be a sounding reference signal (SRS) or a channel state information reference signal (CSI-RS). Based on the reference signal, the path loss $PL_{b,\,f,c}(q_d)$ between the terminal device and the base station can be calculated, and the allocated bandwidth resource $10\log_{10}(2\mu \cdot M_{b,\,f,c}(i))$ is determined according to the number of resource blocks RB allocated by the service executed by the terminal, and the power adjustment value $h_{b,\,f,c}(i,l)$ of the high-level configuration is obtained, the desired target receiving power value of the base station corresponding to the services of each target service type configured by the base station for the terminal is $P_{Cb,\,f,c}(q_s)$, then the candidate transmission power $P_{b,\,f,c}(i,q_s,l)$ corresponding to the services of each target service type executed by the terminal device is determined by adding.

The candidate transmission power of the terminal can be determined by the following formula of the power control protocol:

$$P_{b,f,c}(i, q_s, l) = \min\begin{Bmatrix} P_{CMAX,f,c}(i), \\ P_{Cb,f,c}(q_s) + 10\log_{10}(2^\mu \cdot M_{b,f,c}(i)) + \alpha_{b,f,c}(q_s) \cdot \\ PL_{b,f,c}(q_d) + h_{b,f,c}(i, l) \end{Bmatrix}$$

Where, i refers to the transmission time, f refers to the carrier, c refers to the service cell, b refers to the identification of UL BWP, l refers to the index of power control status, μ is determined according to the msg1-Subcarrier-Spacing parameter in the system information block (SIB), $P_{CMAX,\,f,c}(i)$ is the maximum output power of the terminal device configured for the carrier f of the service cell c in each time slot, and $\alpha_{b,\,f,c}(q_s)$ is the parameter configured for the high level.

Step 402, when the sum of each candidate transmission power is less than or equal to the maximum transmission power, the candidate transmission power of the terminal device corresponding to each target service type is used as the target transmission power of the terminal device corresponding to each target service type.

In the embodiment of the present disclosure, when the sum of each candidate transmission power is less than or equal to the maximum transmission power, which indicates that when the terminal device currently executes services of multiple target service types in parallel, the sum of the determined multiple candidate powers does not exceed the limit value of the maximum transmission power, thus the candidate transmission power determined according to the power control protocol can be directly used as the target transmission power corresponding to services of each target service type executed by the terminal device.

Step 403, when the sum of each candidate transmission power is greater than the maximum transmission power, each candidate transmission power is adjusted according to the maximum transmission power to obtain the corresponding target transmission power.

In the embodiment of the present disclosure, when the sum of each candidate transmission power is greater than the maximum transmission power, which indicates that when the terminal device currently executes services of multiple target service types in parallel, the sum of the determined multiple candidate powers exceeds the limit value of the maximum transmission power, thus it needs to be smaller in proportion so that the sum of multiple candidate powers does not exceed the maximum transmission power.

As an implementation, the proportion of each candidate transmission power is determined according to multiple candidate transmission powers, and each candidate transmission power is adjusted according to the proportion of each candidate power and the maximum transmission power to obtain the corresponding target transmission power. For example, the maximum transmission power is 30 dB, and the terminal device needs to perform two types of services synchronously, namely, voice service and video service. When the calculated candidate transmission power corresponding to voice service is 20 dB, and the candidate transmission power corresponding to video service is 15 dB, the sum of the candidate transmission power of voice service and video service is 35, which is greater than the maximum transmission power of 30 dB, then it is determined that the proportion of candidate power of voice service is 20/35=4/7, while the proportion of candidate power corresponding to video service is 15/35=3/7, and the maximum transmission power is 30 dB. Therefore, it is determined that the target transmission power corresponding to voice service is 30*(4/7)=17, and the target transmission power corresponding to voice service is 30*(3/7)=13. This realizes the determination of the candidate transmission power for the terminal device, and based on the limit of the maximum transmission power, when the maximum transmission power is exceeded, the corresponding target transmission power when the terminal device executes each target service is reduced in proportion, and realizes the modulation of the target transmission power corresponding to different services based on different service requirements, meeting the personalized configuration with different service characteristics.

In the power control method of the embodiment of the present disclosure, at least one protocol data unit session establishment request is sent to the base station, the target receiving power corresponding to each target service type sent by the base station is obtained, the target transmission power corresponding to services of each target service type executed by the terminal device is determined according to each target receiving power and a maximum transmission power of the terminal device. The terminal device obtains the desired target receiving power of different base stations configured for different service types, and determines the target transmitting power corresponding to different service types according to the maximum transmitting power and power control protocol, which meets the personalized configuration with different service characteristic.

In order to realize the above embodiments, the present disclosure also proposes a power control device configured in a base station.

Figure 5:
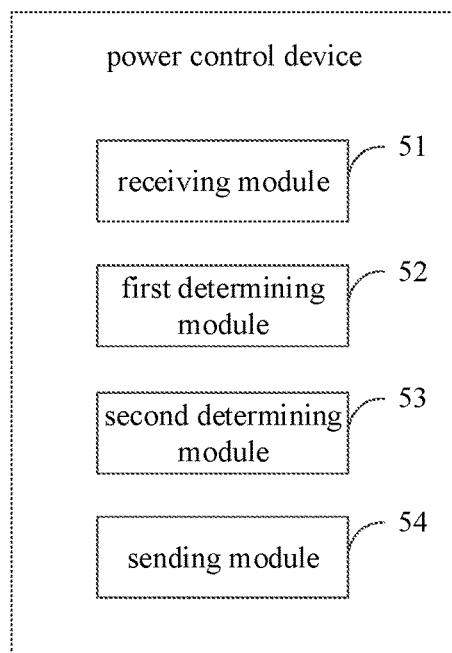
FIG. 5 is a schematic diagram of a power control device according to an embodiment of the present disclosure.

FIG. 5 is a schematic diagram of a power control device according to an embodiment of the present disclosure.

As shown in FIG. 5, the device includes a receiving module 51, a first determining module 52, a second determining module 53 and a sending module 54.

The receiving module 51 is configured to receive at least one protocol data unit session establishment request sent by a terminal device.

The first determining module 52 is configured to determine a target service type carried by each protocol data unit session, according to a data type tag carried by each establishment request.

The second determining module 53 is configured to determine a target receiving power corresponding to each target service type, according to each target service type and a configured receiving power of a base station.

The sending module 54 is configured to send each target receiving power to the terminal device.

Further, in a possible implementation of the embodiments of the present disclosure, the second determining module 53 is configured to:

determine a priority corresponding to each target service type;

determine a power adjustment value corresponding to each target service type, according to the priority corresponding to each target service type;

determining the target receiving power corresponding to each target service type, according to each power adjustment value and the configured receiving power.

In a possible implementation of the embodiments of the present disclosure, the second determining module 53 is configured to:

determine the reference receiving power corresponding to each target service type, according to the configured receiving power and the power adjustment value corresponding to each target service type;

determine the target receiving power corresponding to each target service type, according to the reference receiving power and power adjustment value corresponding to each target service type.

It should be noted that the foregoing explanation of the method embodiment is also applicable to the device of this embodiment, and will not be repeated here.

In the power control device of the embodiment of the present disclosure, at least one protocol data unit session establishment request is sent to the base station, the target receiving power corresponding to each target service type sent by the base station is obtained, the target transmission power corresponding to services of each target service type executed by the terminal device is determined according to each target receiving power and a maximum transmission power of the terminal device. The terminal device obtains the desired target receiving power of different base stations configured for different service types, and determines the target transmitting power corresponding to different service types according to the maximum transmitting power and power control protocol, which meets the personalized configuration with different service characteristic.

In order to realize the above embodiments, the present disclosure also proposes a power control device configured in a base station.

Figure 6:
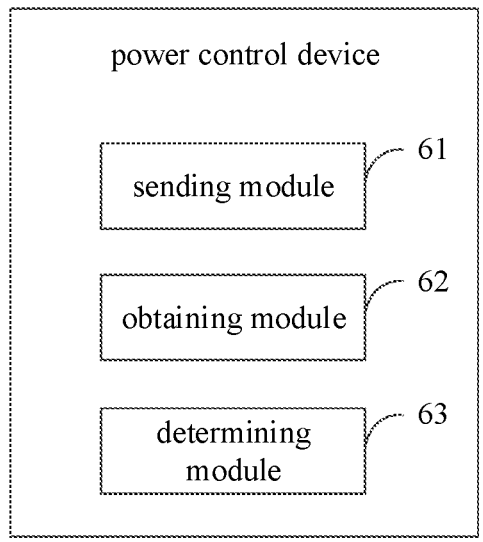
FIG. 6 is a schematic diagram of a power control device according to an embodiment of the present disclosure.

FIG. 6 is a schematic diagram of a power control device according to an embodiment of the present disclosure.

As shown in FIG. 6, the device includes a sending module 61, an obtaining module 62, and a determining module 63.

The sending module 61 is configured to send at least one protocol data unit session establishment request to a base station.

The obtaining module 62 is configured to obtain a target receiving power corresponding to each target service type sent by the base station; wherein each target receiving power is configured by the base station according to each target service type carried by each protocol data unit session, and the target service type is determined by the base station according to a data type tag carried by each establishment request.

The determining module 63 is configured to determine a target transmission power of a terminal device corresponding to each target service type, according to each target receiving power and a maximum transmission power of the terminal device.

Further, in a possible implementation of the embodiments of the present disclosure, the second determining module 63 is configured to:

determine a candidate transmission power of the terminal device corresponding to each target service type, according to the target receiving power;

use the candidate transmission power of the terminal device corresponding to each target service type as the target transmission power of the terminal device corresponding to each target service type, when the sum of each candidate transmission power is less than or equal to the maximum transmission power.

In a possible implementation of the embodiments of the present disclosure, the second determining module 63 is configured to:

adjust each candidate transmission power according to the maximum transmission power to obtain the corresponding target transmission power, when the sum of each candidate transmission power is greater than the maximum transmission power.

In a possible implementation of the embodiments of the present disclosure, the second determining module 63 is configured to:

determine a proportion of each candidate transmission power;

adjust each candidate transmission power according to the proportion and the maximum transmission power, to obtain the corresponding target transmission power.

It should be noted that the foregoing explanation of the method embodiment is also applicable to the device of this embodiment, and will not be repeated here.

In the power control device of the embodiment of the present disclosure, it realizes the determination of candidate transmission power for the terminal device respectively, and based on the limitation of the maximum transmission power, when the maximum transmission power is exceeded, the corresponding target transmission power when the terminal device executes each target service is reduced in proportion, realizes the modulation of the target transmission power corresponding to different services based on different service requirements, and meets the personalized configuration of different service characteristics.

In order to realize the above embodiments, the present disclosure also proposes an electronic device, including memory, processor and computer program stored on the memory and executed by the processor, the method described in the above method embodiments is implemented when the processor executes the program.

In order to realize the above embodiments, the present disclosure also proposes a non-transitory computer readable storage medium storing computer program, the method described in the above method embodiments is implemented when the processor executes the program.

In order to realize the above embodiments, the present disclosure also proposes a computer program product storing computer program, the method described in the above method embodiments is implemented when the processor executes the program.

Figure 7:
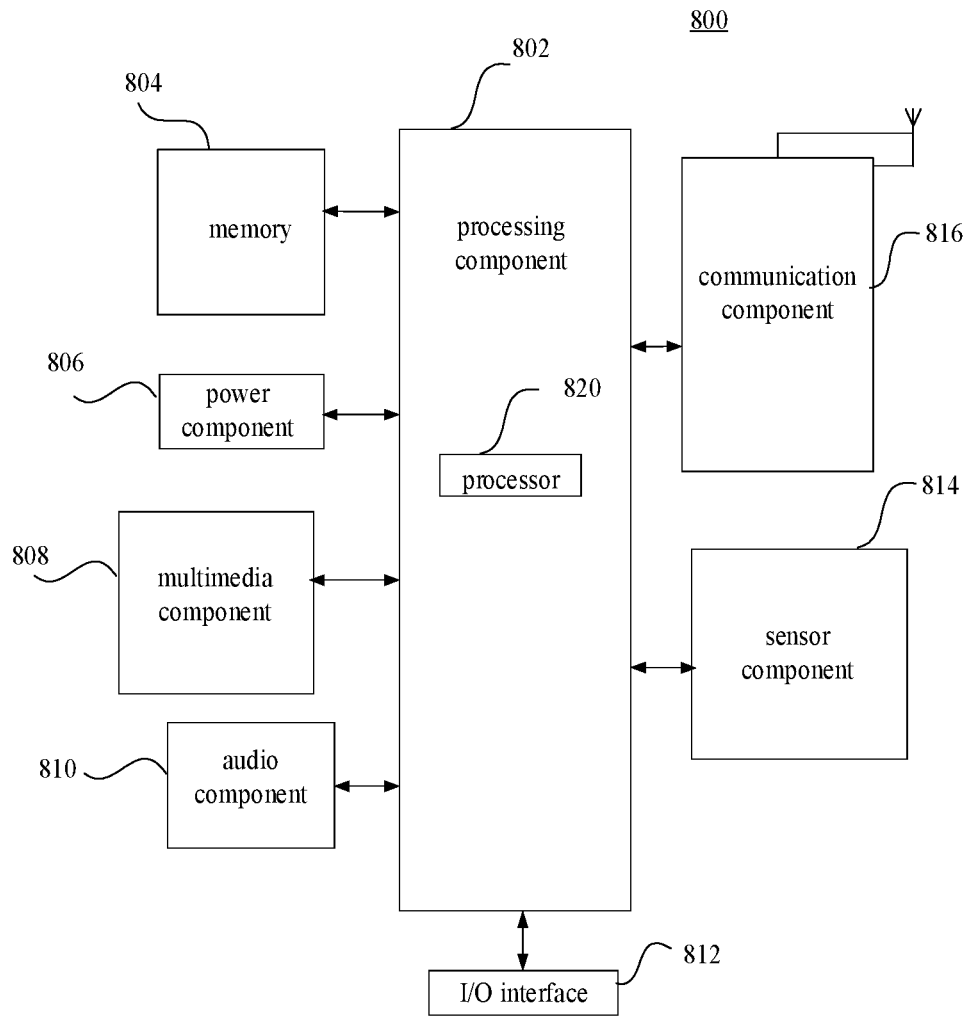
FIG. 7 is a schematic diagram of an electronic device according to an embodiment of the present disclosure.

FIG. 7 is a schematic diagram of an electronic device according to an embodiment of the present disclosure, which is a terminal device. For example, the electronic device 800 may be a mobile phone, a computer, a digital broadcasting terminal, a messaging device, a game console, a tablet device, a medical device, a fitness device, a personal digital assistant, etc.

Referring to FIG. 7, the electronic device 800 may include one or more of the following components: processing component 802, memory 804, power component 806, multimedia component 808, audio component 810, input/output (i/o) interface 812, sensor component 814, and communication component 816.

The processing component 802 typically controls the overall operation of the electronic device 800, such as operations associated with display, phone calls, data communications, camera operations, and recording operations. The processing component 802 may include one or more processors 820 to execute instructions to complete all or part of the steps of the method described above. In addition, the processing component 802 may include one or more modules to facilitate the interaction between the processing component 802 and other components. For example, the processing component 802 may include a multimedia module to facilitate interaction between the multimedia component 208 and the processing component 802.

The memory 804 is configured to store various types of data to support operations in the electronic device 800. Examples of these data include instructions for any application or method operating on the electronic device 800, contact data, phonebook data, messages, pictures, videos, and the like. The memory 804 may be implemented by any type of volatile or nonvolatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 806 provides power to various components of the electronic device 800. Power component 806 may include a power management system, one or more power supplies, and other components associated with generating, managing, and distributing power to electronic device 800.

The multimedia component 808 includes a screen providing an output interface between the electronic device 800 and the user. In some embodiments, the screen may include a liquid crystal display (LCD) and a touch panel (TP). When the screen includes a touch panel, the screen can be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 808 includes a front camera and/or a rear camera. When the electronic device 800 is in an operation mode, such as a shooting mode or a video mode, the front camera and/or the rear camera can receive external multimedia data. Each front camera and rear camera can be a fixed optical lens system or have focal length and optical zoom capabilities.

The audio component 810 is configured to output and/or input audio signals. For example, the audio component 810 includes a microphone (MIC) that is configured to receive external audio signals when the electronic device 800 is in an operating mode, such as a call mode, a recording mode, and a speech recognition mode. The received audio signal may be further stored in the memory 804 or transmitted via the communication component 816. In some embodiments, the audio component 810 also includes a speaker for outputting audio signals.

The I/O interface 812 provides an interface between processing component 802 and peripheral interface module, which can be keyboard, click wheel, button, etc. These buttons can include but are not limited to: Home button, volume button, start button and lock button.

Sensor assembly 814 includes one or more sensors for providing various aspects of condition evaluation for electronic device 800. For example, the sensor assembly 814 can detect the open/close state of the electronic device 800, the relative positioning of the components, such as the display and keypad of the electronic device 800. The sensor assembly 814 can also detect the position change of the electronic device 800 or a component of the electronic device 800, the presence or absence of the user's contact with the electronic device 800, the orientation or acceleration/deceleration of the electronic device 800, and the temperature change of the electronic device 800. The sensor assembly 814 may include a proximity sensor configured to detect the presence of nearby objects without any physical contact. The sensor assembly 814 may also include an optical sensor, such as a CMOS or CCD image sensor, for use in imaging applications. In some embodiments, the sensor assembly 814 may also include an acceleration sensor, a gyroscope sensor, a magnetic sensor, a pressure sensor, or a temperature sensor.

The communication component 816 is configured to facilitate wired or wireless communication between the electronic device 800 and other devices. The electronic device 800 can access wireless networks based on communication standards, such as WiFi, 4G or 5 g, or a combination thereof. In an exemplary embodiment, the communication component 816 receives broadcast signals or broadcast related information from an external broadcast management system via a broadcast channel. In an exemplary embodiment, the communication component 816 also includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

In an exemplary embodiment, the electronic device 800 may be implemented by one or more application specific integrated circuits (ASICs), digital signal processors (DSPS), digital signal processing devices (DSPDs), programmable logic devices (PLDs), field programmable gate arrays (FPGAs), controllers, microcontrollers, microprocessors, or other electronic components for performing the above methods.

In an embodiment, there is also provided a non-temporary computer-readable storage medium including instructions, such as a memory 804 including instructions, which can be executed by the processor 820 of the electronic device 800 to complete the above method. For example, the non-temporary computer-readable storage medium may be ROM, random access memory (RAM), CD-ROM, magnetic tape, floppy disk, optical data storage device, etc.

Figure 8:
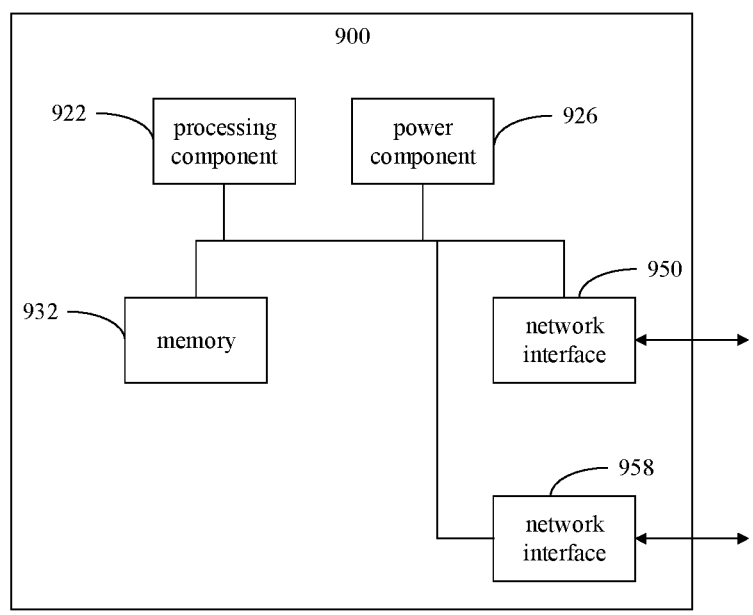
FIG. 8 is a schematic diagram of another electronic device according to an embodiment of the present disclosure.

FIG. 8 is a structural diagram of another electronic device provided by the embodiment of the present disclosure. The electronic device is a base station. In the exemplary embodiment, the base station can be provided as a network device. The base station 900 includes a processing component 922, which further includes at least one processor, and memory resources represented by memory 932 for storing instructions, such as applications, that can be executed by the processing component 922. The application program stored in the memory 932 may include one or more modules, each corresponding to a set of instructions. In addition, the processing component 922 is configured to execute instructions to execute any of the above methods applied to the base station.

The base station 900 may also include a power component 926 configured to perform power management of the base station 900, a wired or wireless network interface 950 configured to connect the base station 900 to the network, and an input/output (I/O) interface 958. The base station 900 may operate an operating system based on the memory 932, such as Windows Server™, Mac OS X™, Unix™, Linux™, FreeBSD™, or the like.

In the description of this specification, the description referring to the terms "one embodiment", "some embodiments", "example", "specific example", or "some examples" means that the specific features, structures, materials, or features described in connection with the embodiments or examples are included in at least one embodiment or example of the present disclosure. In this specification, the schematic expression of the above terms does not have to be aimed at the same embodiments or examples. Moreover, the specific features, structures, materials, or features described may be combined in any one or more embodiments or examples in a suitable manner. In addition, without contradiction, those skilled in the art can combine and combine the different embodiments or examples described in this specification and the features of different embodiments or examples.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "multiple" means at least two, such as two, three, etc., unless otherwise expressly and specifically defined.

Any process or method description in the flowchart or otherwise described herein can be understood as a module, fragment or part of code that represents executable instructions including one or more steps for implementing custom logical functions or processes, and the scope of the preferred implementation of the present disclosure includes additional implementations, which may not be in the order shown or discussed, It includes performing functions in a basically simultaneous manner or in a reverse order according to the functions involved, which should be understood by those skilled in the art to which the embodiments of the present disclosure belong.

The logic and/or steps represented in the flowchart or otherwise described herein, for example, can be considered as a sequenced list of executable instructions for realizing logical functions, which can be specifically implemented in any computer-readable medium for the instruction execution system Devices or devices (such as computer-based systems, systems including processors, or other systems that can take instructions from instruction execution systems, devices, or devices and execute instructions) are used, or used in combination with these instruction execution systems, devices, or devices. For the purposes of this specification, "computer readable medium" may be any device that can contain, store, communicate, transmit or transmit programs for use by or in combination with an instruction execution system, device or device. More specific examples of computer-readable media (non-exhaustive list) include the following: an electrical connection unit (electronic device) with one or more wiring, a portable computer case (magnetic device), a random access memory (RAM), a read-only memory (ROM), an erasable editable read-only memory (EPROM or flash memory), an optical fiber device, and a portable optical disk read-only memory (CDROM). In addition, the computer-readable medium may even be paper or other suitable medium on which the program can be printed, because the program can be obtained electronically, for example, by optical scanning of the paper or other medium, followed by editing, interpretation, or other suitable processing when necessary, and then stored in the computer memory.

It should be understood that parts of the present disclosure may be implemented in hardware, software, firmware, or a combination thereof. In the above described embodiments, a plurality of steps or methods may be implemented with software or firmware stored in memory and executed by a suitable instruction execution system. For example, when implemented in hardware, as in another embodiment, it can be implemented by any of the following technologies known in the art or their combination: discrete logic circuit with logic gate circuit for realizing logic function of data signal, application specific integrated circuit with appropriate combined logic gate circuit, programmable gate array (PGA), field programmable gate array (FPGA), etc.

Those skilled in the art can understand that all or part of the steps carried by the method of realizing the above embodiments can be completed by instructing the relevant hardware through a program, and the program can be stored in a computer-readable storage medium. When the program is executed, it includes one or a combination of the steps of the method embodiments.

In addition, the functional units in various embodiments of the present disclosure can be integrated in a processing module, or each unit can exist separately, or two or more units can be integrated in one module. The above integrated modules can be implemented in the form of hardware or software function modules. When the integrated module is realized in the form of software function module and sold or used as an independent product, it can also be stored in a computer-readable storage medium.

The storage medium mentioned above can be read-only memory, magnetic disk or optical disk, etc. Although the embodiments of the present disclosure have been shown and described above, it can be understood that the above embodiments are exemplary and cannot be understood as limitations of the present disclosure. Those skilled in the art can change, modify, replace and modify the above embodiments within the scope of the present disclosure.

What is claimed is:

1. A power control method, performed by a terminal device, comprising:
    sending at least one protocol data unit (PDU) session establishment request to a base station, wherein each of the at least one PDU session establishment request carries a data type tag;
    obtaining a target receiving power corresponding to each target service type sent by the base station; wherein the target receiving power is determined by the base station according to a power adjustment value corresponding to the target service type and a configured receiving power, wherein the power adjustment value is determined by the base station according to a priority corresponding to the target service type, and the target service type is determined by the base station according to the data type tag; and
    determining a target transmission power corresponding to a service of each target service type executed by a terminal device, according to each target receiving power and a maximum transmission power of the terminal device,
    wherein determining the target transmission power comprises:
    determining a candidate transmission power of the terminal device corresponding to each target service type, according to the target receiving power; and
    when the sum of each candidate transmission power is greater than the maximum transmission power, determining a proportion of each candidate transmission power to the sum of each candidate transmission power, and obtaining the corresponding target transmission power by multiplying the proportion of the candidate transmission power by the maximum transmission power.

2. The method according to claim 1, wherein determining the target transmission power further comprises:
    when a sum of respective candidate transmission power is less than or equal to the maximum transmission power, determining the candidate transmission power of the terminal device corresponding to each target service type as the target transmission power of the terminal device corresponding to each target service type.

3. A terminal device, comprising:
a processor; and
a memory communicatively connected to the processor and storing non-transitory computer-readable instructions that, when executed by the processor, control the processor to:
send at least one protocol data unit (PDU) session establishment request to a base station, wherein each of the at least one PDU session establishment request carries a data type tag;
obtain a target receiving power corresponding to each target service type sent by the base station; wherein the target receiving power is determined by the base station according to a power adjustment value corresponding to the target service type and a configured receiving power, wherein the power adjustment value is determined by the base station according to a priority corresponding to the target service type, and the target service type is determined by the base station according to the data type tag; and
determine a target transmission power corresponding to a service of each target service type executed by a terminal device, according to each target receiving power and a maximum transmission power of the terminal device,
wherein the memory further storing instructions that, when executed by the processor, control the processor to:
determine a candidate transmission power of the terminal device corresponding to each target service type, according to the target receiving power; and
when the sum of each candidate transmission power is greater than the maximum transmission power, determine a proportion of each candidate transmission power to the sum of each candidate transmission power, and obtain the corresponding target transmission power by multiplying the proportion of the candidate transmission power by the maximum transmission power.

4. The terminal device according to claim 3, wherein the memory further storing instructions that, when executed by the processor, control the processor to:
when a sum of respective candidate transmission power is less than or equal to the maximum transmission power, determine the candidate transmission power of the terminal device corresponding to each target service type as the target transmission power of the terminal device corresponding to each target service type.

\* \* \* \* \*